United States Patent [19]

Flood

[11] Patent Number: 4,690,722

[45] Date of Patent: Sep. 1, 1987

[54] ULTRASONIC APPARATUS FOR JOINING AND SEVERING SHEET MATERIAL

[75] Inventor: Gary N. Flood, Washington Depot, Conn.

[73] Assignee: Branson Ultrasonics Corporation, Danbury, Conn.

[21] Appl. No.: 923,030

[22] Filed: Oct. 24, 1986

[51] Int. Cl.[4] .................... B29C 65/08; B32B 31/18
[52] U.S. Cl. ................................ 156/510; 156/73.1; 156/580.2; 156/582; 493/197; 493/202
[58] Field of Search ................ 156/73.1, 73.3, 580.1, 156/580.2, 582, 510, 515, 250, 251, 267; 264/23; 493/195, 197, 200, 202, 208

[56] References Cited

U.S. PATENT DOCUMENTS

| | | | |
|---|---|---|---|
| 3,562,041 | 2/1971 | Robertson | 156/73.3 |
| 3,733,238 | 5/1973 | Long et al. | 156/73.1 |
| 3,749,626 | 7/1973 | Buck | 156/510 |
| 3,939,033 | 2/1976 | Grgach et al. | 156/580.2 |
| 4,430,148 | 2/1984 | Schaefer | 156/73.1 |

Primary Examiner—Michael Wityshyn
Attorney, Agent, or Firm—Philip J. Feig

[57] ABSTRACT

An apparatus for joining sheet material and cutting joined material comprises a set of drums rotating against one another. A first drum is provided along its surface with a raised pattern serving as welding surfaces when operating in conjunction with one or more ultrasonic resonators. As sheet material is fed through the nip formed between the drum and the resonator, the material is joined in accordance with the pattern. A second drum is provided along its surface with a complementary raised pattern of cutting surfaces. As the material subsequently is fed through the nip between both drums, the welded portions are severed from the surrounding material. The welding and cutting pattern surfaces are constructed to mesh for providing positive severing of the material interposed therebetween.

6 Claims, 3 Drawing Figures

ULTRASONIC APPARATUS FOR JOINING AND SEVERING SHEET MATERIAL

SUMMARY OF THE INVENTION

This invention relates to joining two or more juxtaposed layers of sheet material, at least one of the layers containing thermoplastic material, by ultrasonic energy and, more specifically, refers to an apparatus for joining such sheet material in accordance with a desired pattern and subsequently severing the joined material from the surrounding material.

Quite specifically, this invention concerns an apparatus for ultrasonically joining two or more juxtaposed layers of sheet material using an ultrasonically resonant resonator operating in conjunction with a patterned anvil drum, and the use of a second drum operating in conjunction with the anvil drum, the second drum having a patterned cutting surface substantially identical with the pattern of the anvil drum for severing the joined portions joined in accordance with such pattern from the surrounding sheet material.

The use of patterned anvil drums in conjunction with one or more ultrasonic resonators for joining sheet material in accordance with a predetermined pattern is well known in the art, see for instance, U.S. Pat. No. 3,733,238 issued to D. D. Long et al dated May 15, 1973, and U.S. Pat. No. 4,430,148 issued to J. E. Schaefer dated Feb. 7, 1984. The raised pattern on the anvil drum establishes the location at which the sheet material is joined and generally is configured to provide a pleasing appearance.

U.S. Pat. No. 3,562,041 issued to C. A. Robertson and dated Feb. 9, 1971 shows an arrangement wherein a drum (FIG. 4) along its periphery is provided with pattern flanges. Each pattern flange is exposed to the action of an ultrasonically vibrating resonator to cause the joining of textile sheet material interposed between the resonant output surface of the resonator and the raised surface of the pattern flange. The patent illustrates, as an example, the manufacture of shirt sleeve cuffs. The joined material, such as a shirt sleeve cuff, is severed from the surrounding material at a subsequent and separate shearing station having a shearing tool.

The use of a separate shearing station for cutting the joined sheet material from the surrounding material is obviated in an arrangement as disclosed in U.S. Pat. No. 3,939,033 issued to F. Grgach et al dated Feb. 17, 1976. In this patent, the drum is provided with raised surfaces acting as welding surfaces but, in addition, cutting surfaces are provided adjoining the welding surfaces, the cutting surfaces being raised slightly above the level of the welding surfaces. As a result, sheet material fed through the nip between the output surface of the resonator and the drum is sealed and cut simultaneously in a single pass through the nip. A second, separate shearing station is obviated. Practice has shown that in the latter arrangement the cutting surface is subject to wear due to the repetitive high impact force of the resonator upon the relatively narrow and sharp cutting surface. Depending upon the application and material, wear may occur very quickly, thus rendering the apparatus inoperative after only a few hours of use.

The present invention concerns an improved arrangement, utilizing a two-drum arrangement, the drums rotating against one another. A first drum is provided with raised surfaces corresponding to the pattern along which sheet material fed through the nip between the output surface of a resonator and the first drum is to be joined. A second drum rotating against the first drum is provided with raised cutting surfaces which correspond, at least in part, to the pattern on the first drum. As the joined sheet material exits from the nip between the resonator and first drum, the material is fed around the first drum to a second nip formed between the first drum and the second drum, and as the material is fed through the second nip, the material is cut by the coaction between the pattern on the first drum and the confronting cutting pattern surfaces on the second drum. Thus, the cutting surface is not subjected to the impact of the resonator output surface. By providing the welding surface of the first drum with a recess or groove which meshes with the front of the cutting surface of the second drum, the interposed sheet material is securely severed from the surrounding material.

One of the principal objects of this invention is the provision of a new and improved apparatus for ultrasonically joining juxtaposed layers of sheet material and for subsequently severing the joined material from the surrounding material.

Another important object of this invention is the provision of new and improved apparatus for ultrasonically joining and severing sheet material using a first drum for joining sheet material in accordance with a predetermined pattern and a second drum for severing the joined material from the surrounding waste material.

Another important object of this invention is the provision of an apparatus for joining juxtaposed layers of sheet material using an ultrasonic resonator operating in conjunction with a first drum having a pattern of welding surfaces along its surface, and a second drum coacting with the first drum having a pattern of cutting surfaces confronting the pattern of welding surfaces whereby as the drums rotate against each other the welded material is cut in response to the welded sheet material being fed through the nip between the first and second drums.

A further important object of this invention is the provision of an ultrasonic seal and cut apparatus for sheet material, the apparatus not being subject to excessive wear and thus providing high reliability and long life.

Still other and further objects of this inventions will become more clearly apparent by reference to the following description when read in conjunction with the accompanying drawings.

DETAILED DESCRIPTION OF THE INVENTION

Figure 1:
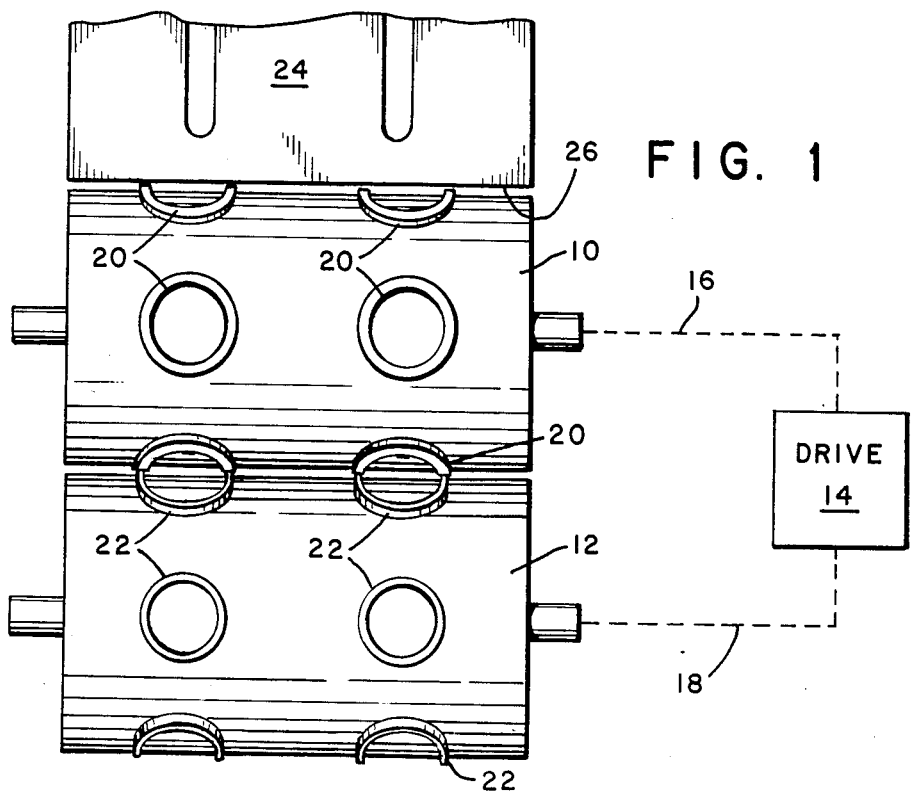
FIG. 1 is a schematic elevational view of the apparatus comprising the present invention.
Figure 2:
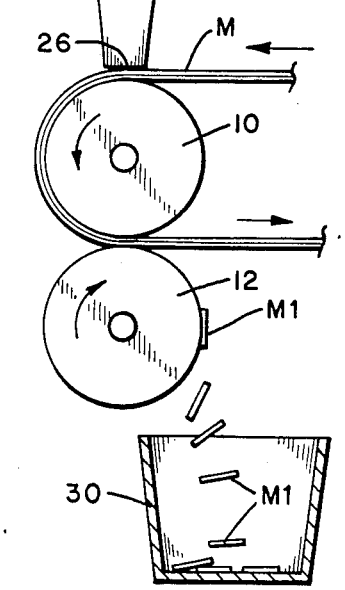
FIG. 2 is a side view of the apparatus.

Referring now to the figures and FIGS. 1 and 2 in particular, numerals 10 and 12 refer to a set of rotatably mounted drums which rotate against each other in synchronism by being driven from drive means 14 through mechanical means 16 and 18. Drum 10 is provided along its surface with a pattern of raised welding surfaces 20, in the present example annular surfaces, to produce, for instance, filter disks welded together at the periphery.

A complementary pattern of cutting surfaces 22 is provided on the surface of drum 12, and both patterns and drums are arranged to cause a respective welding surface pattern portion of the drum 10 to be in confronting relationship with a respective cutting surface pattern portion 22 of the drum 12 as the drums 10 and 12 rotate in synchronism responsive to the operation of the drive means 14.

A resonator or horn 24 dimensioned to be resonant at a predetermined ultrasonic frequency has an output surface 26 which is disposed in confronting relationship with the surface of drum 10. The resonator typically is constructed as shown in the patent of Robertson supra and U.S. Pat. No. 3,113,225 issued to C. Kleesattel et al dated Dec. 3, 1963. Resonators of this type are well known in the art and commonly referred to as blade shaped resonators. Resonators of this type are either used singly or in an array when wide sheet material is to be welded, see the patent to Long et al supra. The output surface 26 together with the surface of the drum 10 form a nip through which juxtaposed layers of sheet material M are fed. To effect joining of sheet material, it is necessary that at least one of the superposed layers of sheet material contains thermoplastic material. When the resonator 24 is rendered resonant at an ultrasonic frequency and the output surface 26 undergoes excursion toward and away from the surface of the roller 10, the sheet material M is fed through the nip between the roller and resonator. The raised welding surfaces 20 form anvil surfaces for the sheet material. Responsive to the dissipation of ultrasonic energy in the layers of material, the layers are joined in accordance with the pattern of welding surfaces 20 as amply described in the prior art. For rendering the resonator resonant, the resonator is coupled to an electroacoustic converter which is energized with electrical energy from an electrical high frequency generator, see Kleesattel et al supra.

In the present apparatus, after being fed through the nip between the resonator 24 and drum 10, the material M is fed around the surface of the drum 10 to a second nip formed between the drums 10 and 12, see FIG. 2. As the material is fed through this second nip, the joined and welded material is cut by the coaction of the confronting welding surfaces 20 on drum 10 and the cutting surfaces 22 on drum 12. The severed pieces M1, in the present example, fall into a receptacle 30.

Figure 3:
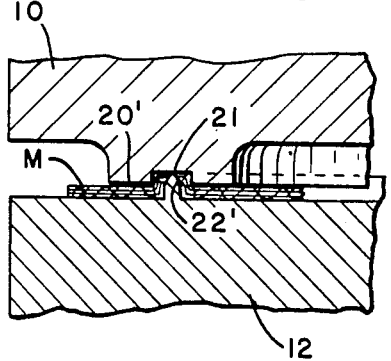
FIG. 3 is an enlarged view showing the confronting welding and cutting surfaces.

FIG. 3 depicts a typical and preferred embodiment of the welding and cutting surfaces disposed about the surface of the respective drums and illustrates the coaction of such surfaces. Numeral 20' denotes a portion of the welding surface pattern which is in confronting relationship with a portion 22' of the cutting surface pattern. The raised flat welding surface is provided with a groove 21, typically centrally disposed relative to the width of the welding surface. In a complementary manner, the cutting surface 22' is shaped to present a cutting edge entering the groove 21. With the sheet material M interposed therebetween, a cutting action occurs for effecting a severing of the joined material M. Importantly, in the arrangement shown, the cutting surface is not subjected to a repetitive high g force impact by the ultrasonic resonator and, therefore, the cutting surface is retained sharp for an extended period of time.

In an alternative embodiment, the groove 21 may be disposed at the outer edge of the welding surface.

As a result of the use of two complementary drums, the process of joining and severing sheet material is accomplished in a smooth and continuous manner. It will be apparent, moreover, that during operation respective portions of the welding surface pattern 20 on drum 10 must become disposed opposite complementary portions of the cutting surface pattern 22 on drum 12 so that the patterns mesh in the manner illustrated. Synchronized rotation of both drums is accomplished by the drive mechanism 14.

While there have been described and illustrated a preferred embodiment of the invention and certain alternative embodiments thereof, it will be apparent to those skilled in the art that various further changes and modifications may be made without departing from the principle of this invention which shall be limited only by the scope of the appended claims.

What is claimed is:

1. An apparatus for joining two or more juxtaposed layers of sheet material, at least one of said layers containing thermoplastic material, in accordance with a desired pattern, comprising:
   a first rotatably mounted drum having a pattern of raised welding surfaces along its surface, said pattern corresponding to the desired pattern;
   a second rotatably mounted drum having along its surface a pattern of raised cutting surfaces corresponding at least in part to said pattern of welding surfaces, said second drum mounted in facing relationship with said first drum for providing therebetween a nip for feeding sheet material therethrough responsive to the rotation of said drums whereby sequentially portions of said cutting surfaces are disposed in confronting relationship with respective portions of said welding surfaces;
   a resonator capable of providing vibrations in the ultrasonic frequency range at an output surface thereof mounted for causing said output surface and first drum to form a nip through which the layers of juxtaposed sheet material are fed responsive to the rotation of said first drum,
   whereby when said resonator is rendered resonant and urged toward said pattern of welding surfaces and the sheet material is fed through the nip between said output surface and said first drum the juxtaposed layers are welded to one another in accordance with the pattern of welding surfaces and when the material is fed through the nip between said first drum and second drum the welded layers are severed in accordance with the pattern of cutting surfaces of said second drum.

2. An apparatus as set forth in claim 1, and means for rotating said drums in synchronism.

3. An apparatus as set forth in claim 1, said resonator being blade shaped.

4. An apparatus as set forth in claim 1, said welding surfaces being provided with a groove, and said cutting surfaces engaging said groove for causing severance of the welded layers of sheet material.

5. An apparatus as set forth in claim 4, said raised welding surfaces including a flat upper surface, said groove being disposed substantially centrally along the width of said flat surface.

6. An apparatus as set forth in claim 1, said sheet material being fed first through the nip between said output surface and said first drum, then around a portion of said first drum, and then through the nip between said first and second drums.

* * * * *